United States Patent [19] [11] 4,389,984

Destrampe [45] Jun. 28, 1983

[54] POST-SHUTDOWN COOLANT-SUPPLY DEVICE

[76] Inventor: Terry G. Destrampe, P. O. Box 372, Maricopa, Calif. 93252

[21] Appl. No.: 247,900

[22] Filed: Mar. 26, 1981

[51] Int. Cl.$^3$ .......................... F15B 1/04; F16N 7/14; F01M 1/04; F01B 31/00

[52] U.S. Cl. .................................. 123/196 S; 60/605; 92/60; 92/82; 92/86; 92/130 D; 137/312; 184/6.11; 251/63.5; 251/63.6

[58] Field of Search ................. 60/404, 413, 416, 605; 92/86, 130 R, 130 D, 60, 82; 123/196 R, 196 A, 196 S; 137/312; 138/31; 184/6.3; 251/63.5, 63.6

[56] References Cited

U.S. PATENT DOCUMENTS

| | | | |
|---|---|---|---|
| 1,495,715 | 5/1924 | Robinson | 184/45 R |
| 1,548,163 | 8/1925 | Nicholson | 251/63.5 |
| 1,562,037 | 11/1925 | Moore | 184/7 E |
| 2,888,098 | 5/1959 | Florence | 184/7 |
| 2,930,188 | 3/1960 | Haworth et al. | 60/39.09 |
| 3,138,221 | 6/1964 | Kofink et al. | 184/6 |
| 3,827,236 | 8/1974 | Rust | 60/13 R |
| 4,058,981 | 11/1977 | Henson | 60/605 |
| 4,157,744 | 6/1979 | Capriotti | 184/6.3 |

FOREIGN PATENT DOCUMENTS

| | | | |
|---|---|---|---|
| 2846975 | 5/1980 | Fed. Rep. of Germany | 60/605 |

*Primary Examiner*—William R. Cline
*Assistant Examiner*—John M. Kramer
*Attorney, Agent, or Firm*—Max E. Shirk

[57] ABSTRACT

The impeller bearings in a turbocharger on an internal combustion engine are supplied with a coolant, in the form of lubricating oil from the engine's crankcase, during post-shutdown coasting of the impeller. This coolant is supplied by an accumulator including a piston having an upstream side which is subjected to oil under pressure from the crankcase during engine operation to move the piston downstream for loading a spring affixed to the downstream side of the piston. Coolant leaking downstream of the piston is returned to the crankcase through a valve seat which is closed during engine operation by a valve extending from the downstream side of the piston.

6 Claims, 2 Drawing Figures

POST-SHUTDOWN COOLANT-SUPPLY DEVICE

BACKGROUND OF THE INVENTION

1. Field of the Invention

The present invention relates generally to the field of lubricating and cooling components of vehicle engines and more particularly to a new and useful device for supplying post-shutdown coolant to a turbocharger.

2. Brief Description of the Prior Art

The impeller in a turbocharger is driven by the high-temperature exhaust stream from an internal combustion engine. During operation, at very high rpm, the bearings in the turbocharger receive lubricating and cooling oil from the engine's oil pump.

When the engine is shut off, the impeller has a considerable run-down time when it is coasting without receiving oil from the oil pump. During run-down, the high temperatures in the turbocharger quickly dissipates any residual oil in the impeller bearings resulting in a short turbocharger life.

Prior art known to applicant comprises the following United States Patents:

Robinson, U.S. Pat. No. 1,495,715;
Moore, U.S. Pat. No. 1,562,037;
Florence, U.S. Pat. No. 2,888,098;
Haworth et al., U.S. Pat. No. 2,930,188;
Kofink et al., U.S. Pat. No. 3,138,221;
Rust, U.S. Pat. No. 3,827,236; and
Capriotti, U.S. Pat. No. 4,157,744.

Capriotti U.S. Pat. No. 4,157,744 discloses a device for automatically supplying both pre-lubrication and post-shutdown cooling lubrication to a turbocharger. The device features bleeding oil from the main oil supply line during engine operation to fill a pair of tanks with oil under piston compression. Upon engine shutdown, a control valve opens to permit cooling oil to flow from one tank to the turbocharger. Upon recranking another valve opens to permit flow of pre-lubricating oil from the second tank to the turbocharger.

Robinson U.S. Pat. No. 1,495,715 shows a piston having a tailrod which serves as a valve member.

Rust U.S. Pat. No. 3,827,236 discloses a cooling system for turbochargers including an auxiliary pump and conduits bypassing the engine oil pump, the auxiliary pump being controlled in its operation by both a temperature-responsive device in the turbocharger and a low-or-no-pressure responsive device.

Kofink et al, U.S. Pat. No. 3,138,221 discloses a device for supplying oil to a turbocharger during start-up. In one embodiment of this invention, oil is accumulated in a bellows which is held against the force of a strong spring by a solenoid-actuated latch which is de-latched by the ignition system. In a second embodiment, the piston in a piston-type pump is driven by a solenoid plunger.

The remaining patents are of interest as showing the state of the art.

SUMMARY OF THE INVENTION

The present invention exemplifies improvements over these prior art devices.

The best mode currently contemplated for carrying out the invention includes the provision of an accumulator having a spring-biased piston for supplying post-shutdown coolant through an upstream fitting and a downstream fitting for returning coolant which passes downstream of the piston to a coolant reservoir. The piston may be provided with a depending valve adapted to seat on a valve seat communicating with the downstream fitting for preventing return of coolant to the reservoir when the accumulator is storing coolant under pressure.

The present invention may also include the provision of a spring follower reciprocably mounted in the accumulator in encompassing relationship with the depending valve, a first compression spring for exerting a force between the downstream end of the accumulator and the spring follower, a second compression spring for exerting a force between the spring follower and the piston and a check valve for controlling flow of coolant from a coolant pump to the accumulator and a turbocharger and from the accumulator to the turbocharger.

The features of the present invention which are believed to be novel are set forth with particularity in the appended claims. The present invention, both as to its organization and operation, together with further objects and advantages thereof, may best be understood by reference to the following description, taken in connection with the accompanying drawing in which like reference characters refer to like elements in the several views.

DESCRIPTION OF THE PREFERRED EMBODIMENT

Figure 1:
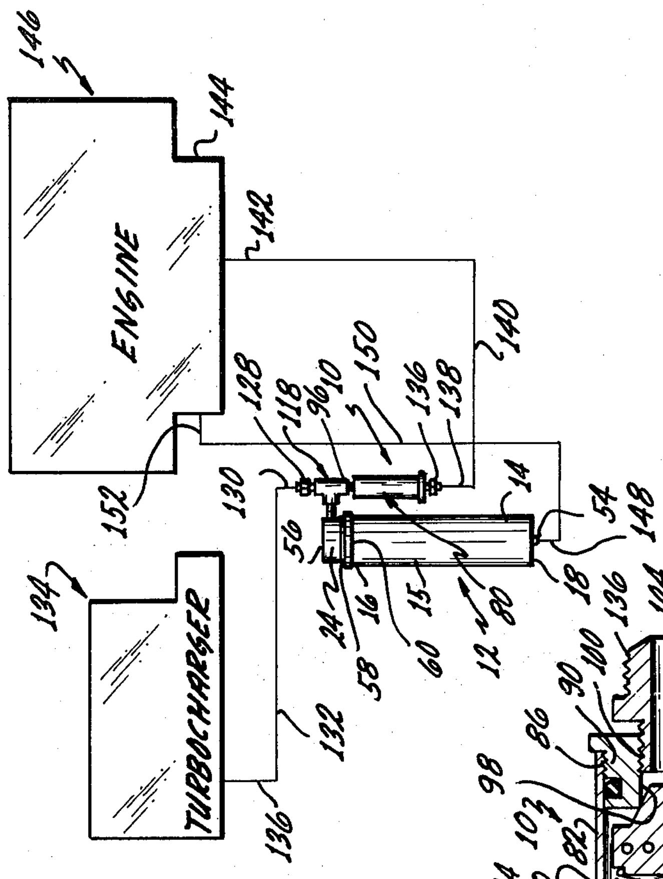
FIG. 1 is a schematic view showing a post-shutdown coolant-supply device of the present invention in combination with a turbocharger and a vehicle engine.
Figure 2:
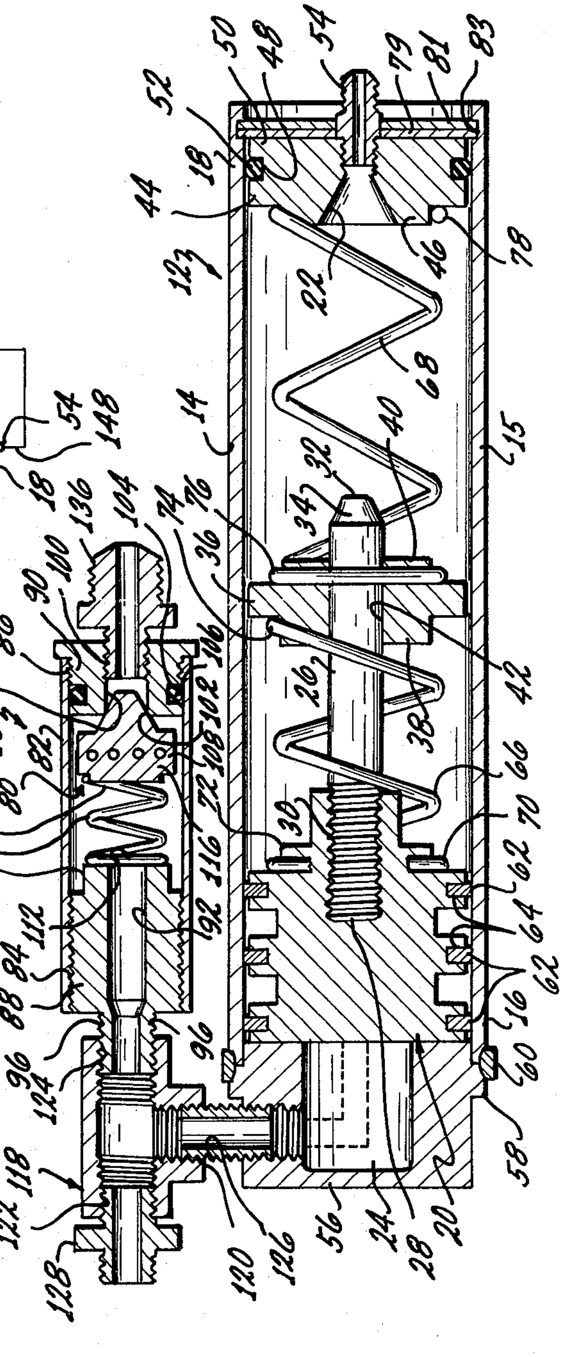
FIG. 2 is an enlarged cross-sectional view of the device of FIG. 1.

Referring again to the drawing, a post-shutdown coolant-supply device constituting a presently-preferred embodiment of the present invention, generally designated 10, includes an accumulator 12 comprising a cylinder 14 having an encompassing sidewall 15, an upstream end 16 and a downstream end 18, a piston 20 reciprocably mounted in cylinder 14, a first valve seat 22 mounted to downstream end 18 and a unitary coolant inlet-outlet fitting 24 mounted to upstream end 16.

Accumulator 12 also comprises a tailrod 26 having a first end 28 provided with external threads 30 and a second end 32 provided with a first valve 34. End 28 of tailrod 26 may be threadedly attached to piston 20 in alignment with valve seat 22 for seating engagement therewith when piston 20 is in its downstream position. A spring follower 36 is also reciprocably mounted in cylinder 14 and includes first and second reduced-diameter portions 38, 40, respectively, and a bore or aperture 42 slidably receiving tailrod 26.

The first valve seat 22 may be provided in a plug 44 having a reduced-diameter upstream end 46, an intermediate, annular groove 48 and a downstream end 50. A suitable elastomeric washer 52 may be fitted to groove 48 for sealing plug 44 to cylinder 14 and a suitable pipe fitting 54 may be fitted to downstream end 50 of plug 44 in fluid communication with valve seat 22.

Inlet-outlet fitting 24 may be provided in a suitable cap member 56 having an annular flange 58 secured to the upstream end 16 of cylinder 14 by a weldment 60. Piston 20 is provided with a plurality of piston rings 62 fitted in grooves 64 for minimizing the passage of coolant downstream of piston 20 and is biased into engagement with cap member 56 by a pair of compression springs 66, 68. Spring 66 has an upstream end 70 encompassing a reduced-diameter portion 72 on piston 20 and a downstream end 74 encompassing the reduced-diameter portion 38 of spring follower 36. Spring 68 has an upstream end 76 encompassing the reduced-diameter portion 40 of spring follower 36 and a downstream end 78 encompassing the upstream end 46 on plug 44. Plug 44 may be secured to end 18 of cylinder 14 by engaging a pair of snap rings 79, 81 in an annular groove 83 provided in end 18.

The post-shutdown, coolant-supply device 10 also includes a check valve assembly 80 having a cylindrical body portion 82 including internally-threaded upstream and downstream ends 84, 86, respectively, fitted with externally-threaded fittings 88, 90, respectively. Fitting 88 is provided with a bore 92, a reduced-diameter downstream end 94 and a reduced-diameter, externally-threaded upstream end 96. Fitting 90 is provided with a bore 98 having internal threads 100 at its downstream end and a second valve seat 102 at its upstream end. Fitting 90 is also provided with an annular groove 104 in which an elastomeric ring 106 is mounted for minimizing leakage of coolant downstream of fitting 90. Check valve assembly 80 includes a second valve 108 normally biased into seated engagement with the second valve seat 102 by a spring 110 having an upstream end 112 encompassing the reduced-diameter downstream end 94 of fitting 88 and a downstream end 114 encompassing a reduced-diameter, upstream portion 116 of the second valve 108.

Device 10 also includes a T-shaped fitting 118 having internally-threaded ports 120, 122, 124. Check valve assembly 80 is connected to port 124 by threadedly connecting end 96 of fitting 88 thereto and port 120 is placed in fluid communication with inlet-outlet fitting 24 by a suitable nipple 126. Port 122 carries a pipe fitting 128 to which one end 130 of a first conduit or pipeline 132 is connected for supplying a cooling, lubricating oil or coolant to an engine component or turbocharger 134 to which the other end 136 of pipeline 132 is connected.

Fitting 90 on check valve assembly 80 carries a pipe fitting 136 to which one end 138 of a second conduit or pipeline 140 is connected. The other end 142 of pipeline 140 is connected to a coolant reservoir 144 on a vehicle engine 146 so that coolant in reservoir 144 may be pumped under pressure from reservoir 144 to check valve assembly 80 by a conventional oil pump (not shown) in engine 146.

Fitting 54 on accumulator 12 is connected to one end 148 of a third conduit or pipeline 150 having its other end 152 connected to reservoir 144 for returning coolant thereto.

Operation of device 10 is believed to be apparent from the foregoing and will be briefly summarized at this point.

At engine start-up, coolant or lubricating oil leaves reservoir 144 under pressure through pipeline 140, unseats second valve 108, flows through nipple 126 and fitting 24, forcing piston 20 toward downstream end 18, loading springs 66, 68 and seating valve 34. Coolant also flows through pipeline 132 to turbocharger 134 for lubricating and cooling the bearings therein.

At engine shut-down, spring 110 seats valve 108 and springs 66, 68 drive piston 20 upstream unseating valve 34 and forcing the coolant accumulated in accumulator 12 through fitting 24, nipple 126 and pipeline 132 to turbocharger 134 for post-shutdown cooling. Any coolant which may have passed downstream of piston 20 then flows back to reservoir 144 through pipeline 150.

While the particular post-shutdown coolant-supply device herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of the same.

What is claimed is:

1. In combination with a post-shutdown cooling system for an apparatus receiving coolant under pressure from an engine including a coolant reservoir and a pump drawing coolant from the reservoir and supplying it to said apparatus during normal engine operation, said post-shutdown cooling system including a coolant accumulator comprising a cylinder having an upstream end and a downstream end, a piston reciprocably mounted in said cylinder, means mounted in said cylinder for biasing said piston toward said upstream end, a first conduit for supplying coolant from said pump to said upstream end of said cylinder for moving said piston toward said downstream end of said cylinder to load said biasing means and a second conduit for supplying fluid from said accumulator to said apparatus, the improvement which comprises:

means connecting said downstream end of said cylinder to said coolant reservoir for returning any coolant passing downstream of said piston to said reservoir; and valve means provided in said accumulator in fluid communication with said connecting means for controlling flow of coolant from said downstream end of said cylinder to said reservoir.

2. The combination as recited in claim 1 including:

a unitary inlet-outlet fitting mounted to said upstream end of said cylinder;

a T-shaped fitting having first, second and third ports;

a pipe nipple connecting a first one of said ports to said inlet-outlet fitting;

means for connecting a second one of said ports to said second conduit;

a check valve having an inlet and an outlet, said check valve including a valve member for preventing reverse flow through said check valve inlet;

means for connecting said check valve outlet to a third one of said ports on said T-shaped fitting; and means for connecting said check valve inlet to said first conduit, whereby said pump will unseat said valve member in said check valve, charge said accumulator while simultaneously supplying coolant to said apparatus until engine shutdown whereupon said biasing means will move said piston toward said upstream end of said cylinder causing the coolant stored in said accumulator to close said valve member and flow through said second one of said ports and said second conduit to said apparatus.

3. The combination recited in claim 1 wherein said valve means comprises:

a valve seat mounted to said downstream end of said cylinder; and a valve extending from said piston in alignment with said valve seat for seating thereon when said piston is moved toward said downstream end of said cylinder until said biasing means is loaded.

4. The combination as recited in claim 3 wherein said accumulator includes a spring follower reciprocably mounted in said cylinder in encompassing relationship with said depending valve and wherein said biasing means comprises:

a first compression spring mounted in said cylinder, said first compression spring having a first end engaging said piston and a second end engaging said spring follower; and a second compression spring mounted in said cylinder, said second compression spring having a first end engaging said spring follower and a second end engaging said downstream end of said cylinder, whereby said first and second compression springs bias said piston to a position adjacent said upstream end of said cylinder.

5. Apparatus for post-shutdown cooling of a system component of an engine including an oil pan and an oil pump, comprising:

(1) an accumulator including:

(A) a hollow cylinder having first and second ends;

(B) a first fluid outlet provided at one of said first and second ends of said cylinder, said first fluid outlet being in fluid communication with a first valve seat mounted inside of said cylinder;

(C) a fluid inlet-outlet provided at the other of said first and second ends of said cylinder;

(D) a piston reciprocably mounted in said cylinder, said piston having an upstream end facing said other of said first and second ends of said cylinder and a downstream end facing said one of said first and second ends of said cylinder;

(E) a first valve depending from said downstream end of said piston in alignment with said first valve seat for preventing flow of fluid through said first fluid outlet when said first valve is seated on said first valve seat;

(F) a spring follower reciprocably mounted in said cylinder between said downstream end of said piston and said one of said first and second ends of said cylinder, said spring follower being provided with an aperture in which said depending valve is reciprocably mounted;

(G) a first compression spring mounted in said cylinder, said first compression spring having a first end engaging said downstream end of said piston and a second end engaging said spring follower; and (H) a second compression spring mounted in said cylinder, said second compression spring having a first end engaging said spring follower and a second end engaging said one of said first and second ends of said cylinder, whereby said first and second compression springs bias said piston to a position adjacent said other of said first and second ends of said cylinder;

(2) a first conduit connecting said first outlet to said oil pan for returning any fluid passing downstream of said piston to said oil pan;

(3) a check valve having an upstream end and a downstream end, said check valve also having a second valve seat mounted in said downstream end of said check valve, a second valve and a spring biasing said second valve into seated engagement with said second valve seat;

(4) a fluid inlet connected to said second valve seat;

(5) a second conduit connecting said fluid inlet to said oil pump for supplying pressurized fluid to said check valve to unseat said valve;

(6) a third conduit connecting said upstream end of said check valve to said inlet-outlet on said cylinder; and (7) a fourth conduit connecting said upstream end of said check valve to said system component and to said third conduit, whereby fluid under pressure from said oil pump will unseat said second valve, supply cooling fluid to said system component and move said piston toward said one of said first and second ends of said cylinder until said first valve seats on said first valve seat until flow of fluid from said oil pump ceases at which time said first and second compression springs will move said piston to said other of said first and second ends of said cylinder for supplying fluid to said system component.

6. In combination with a post-shutdown cooling system for an apparatus receiving coolant under pressure from an engine including a coolant reservoir and a pump drawing coolant from the reservoir and supplying it to said apparatus during normal engine operation, said post-shutdown cooling system including a coolant accumulator comprising a cylinder having an upstream end and a downstream end and a piston reciprocably mounted in said cylinder, the improvement which comprises:

a first valve seat mounted to said downstream end of said cylinder;

means placing said first valve seat in fluid communication with said coolant reservoir;

a unitary fluid inlet-outlet fitting mounted to said upstream end of said cylinder;

a spring follower reciprocably mounted in said cylinder intermediate said piston and said downstream end, said spring follower being provided with an aperture;

a first valve depending from said piston and extending through said aperture in alignment with said first valve seat for controlling flow of coolant therethrough;

a first compression spring mounted in said cylinder, said first compression spring having a first end engaging said piston and a second end engaging said spring follower;

a second compression spring mounted in said cylinder, said second compression spring having a first end engaging said spring follower and a second end engaging said downstream end of said cylinder, whereby said first and second compression springs bias said piston to a position adjacent said upstream end of said cylinder;

a check valve having an upstream end and a downstream end, said check valve also having a second valve seat mounted in said downstream end of said check valve, a second valve and a spring biasing said second valve into seated engagement with said second valve seat;

a first conduit connecting said second valve seat to said pump for supplying pressurized coolant to said check valve to unseat said valve;

a second conduit connecting said upstream end of said check valve to said unitary inlet-outlet fitting on said cylinder; and a third conduit connecting said upstream end of said check valve to said apparatus and to said second conduit, whereby fluid under pressure from said pump will unseat said second valve, supply coolant to said apparatus and move said piston toward said downstream end of said cylinder to seat said first valve on said first valve seat until flow of fluid from said pump ceases at which time said first and second compression springs will move said piston to said upstream end of said cylinder for supplying post-shutdown coolant to said apparatus.

* * * * *